(12) United States Patent
Ben Ayed

(10) Patent No.: US 7,664,463 B2
(45) Date of Patent: Feb. 16, 2010

(54) PORTABLE LOSS PREVENTION SYSTEM

(76) Inventor: Mourad Ben Ayed, 315 Charger St., #67, Revere, MA (US) 02151

( * ) Notice: Subject to any disclaimer, the term of this patent is extended or adjusted under 35 U.S.C. 154(b) by 0 days.

(21) Appl. No.: 11/204,483

(22) Filed: Aug. 17, 2005

(65) Prior Publication Data

US 2007/0042714 A1 Feb. 22, 2007

(51) Int. Cl.
*H04B 7/00* (2006.01)
(52) U.S. Cl. ............... 455/41.2; 455/419; 455/420; 455/404.1; 455/404.2; 455/410; 455/421; 340/571; 340/540
(58) Field of Classification Search ............... 455/419, 455/420, 404.1, 404.2, 410, 421, 41.2; 340/571, 340/540
See application file for complete search history.

(56) References Cited

U.S. PATENT DOCUMENTS

| 5,796,338 | A  | * | 8/1998  | Mardirossian ............... 340/571 |
| 6,154,665 | A  | * | 11/2000 | Briffett et al. ................ 455/574 |
| 6,836,212 | B2 | * | 12/2004 | Sawinski ............... 340/539.23 |
| 7,145,454 | B2 | * | 12/2006 | Linjama et al. ............. 340/540 |
| 7,254,367 | B2 | * | 8/2007  | Helden et al. .............. 455/41.2 |
| 7,272,404 | B2 | * | 9/2007  | Overy et al. ............. 455/456.1 |
| 7,289,036 | B2 | * | 10/2007 | Salzhauer et al. ........... 340/692 |

* cited by examiner

*Primary Examiner*—Nay A Maung
*Assistant Examiner*—Ping Y Hsieh
(74) *Attorney, Agent, or Firm*—Daniel B. Schein, Esq.

(57) ABSTRACT

A loss prevention system containing a Bluetooth transceiver and a motion detection system monitors the presence of a portable electronic device such as a cell phone in the vicinity and alerts when that device leaves its vicinity. The system transceiver is activated upon detecting a movement and turned off after a check is done in order to conserve battery.

8 Claims, 6 Drawing Sheets

PORTABLE LOSS PREVENTION SYSTEM

FIELD OF THE INVENTION

This invention is directed generally to loss prevention systems and more specifically to a portable device that monitors the presence of a wireless communication device and that issues an alert when said device is not in proximity.

BACKGROUND OF THE INVENTION

Portable electronic devices such as cellular telephones, personal digital assistants (PDAs), wireless email devices, instant messaging devices, pagers, portable compact disk (CD) players, and portable MP3 players, and others are often forgotten, lost or stolen.

Existing wireless device loss detection approaches focus primarily on remotely programming the lost device to prohibit the device from performing certain operations, such as prohibiting the placement of phone calls, and/or instruct the device to perform certain operations, such as displaying device owner information or erasing certain data stored in the device, in an attempt to increase the user's chances of recovering the device or protecting data stored in the device. This method does not allow users to quickly recover their lost devices.

Other methods for tracking and locating a lost cell phone consist in network triangulation and GPS interrogation. This method does not allow users to instantaneously recover their lost devices.

U.S. Pat. No. 6,836,212 by Sawinski discloses a method and apparatus for reducing the likelihood of loosing a portable electronic device by monitoring inadvertent removal of a portable electronic device from its retaining device. This method does not protect users from removing their devices from their retaining devices, then losing them or forgetting them.

There is a need for a more convenient and reliable method and apparatus for alerting users upon detecting their wireless communication devices are not in the vicinity.

SUMMARY OF INVENTION

A unitary remotely configurable portable electronic loss prevention system comprising Bluetooth transceiver means for discovering Bluetooth devices in the vicinity, a motion detection system for detection of movement, a memory for storing the Bluetooth ID of a monitored portable electronic device, one or more batteries, a processor for turning on the Bluetooth transceiver on detection of movement, comparing the Bluetooth ID of Bluetooth devices in the vicinity with the Bluetooth ID of said monitored portable electronic device, and turning off said Bluetooth transceiver, an alert system to inform a user in the event said portable electronic device is not in the vicinity.

A method for monitoring proximity to a Bluetooth portable electronic device using a remotely configurable unitary portable detection system comprising on detecting a motion using a motion detector, a Bluetooth transceiver is turned on, said Bluetooth transceiver automatically discovers Bluetooth devices in the vicinity, a processor compares the Bluetooth IDs of said Bluetooth devices in the vicinity with the Bluetooth ID of said portable electronic device stored in memory, if a match is not found, an alert is issued to the user, if a match is found, said Bluetooth transceiver is turned off.

A method for monitoring proximity to a portable electronic device using a unitary portable detection system comprising on detecting a motion using a motion detector, a transceiver is turned on, said transceiver discovers compatible transceiver devices in the vicinity, a processor compares the IDs of said compatible transceivers in the vicinity with the ID of said portable electronic device stored in memory, if a match is not found, an alert is issued to the user, if a match is found, said transceiver is turned off.

BRIEF DESCRIPTION OF THE DRAWINGS

The present invention with be more clearly understood after reference to the following detailed specifications read in conjunction with the drawings wherein.

DETAILED DESCRIPTION OF THE PREFERRED EMBODIMENTS

Figure 1:
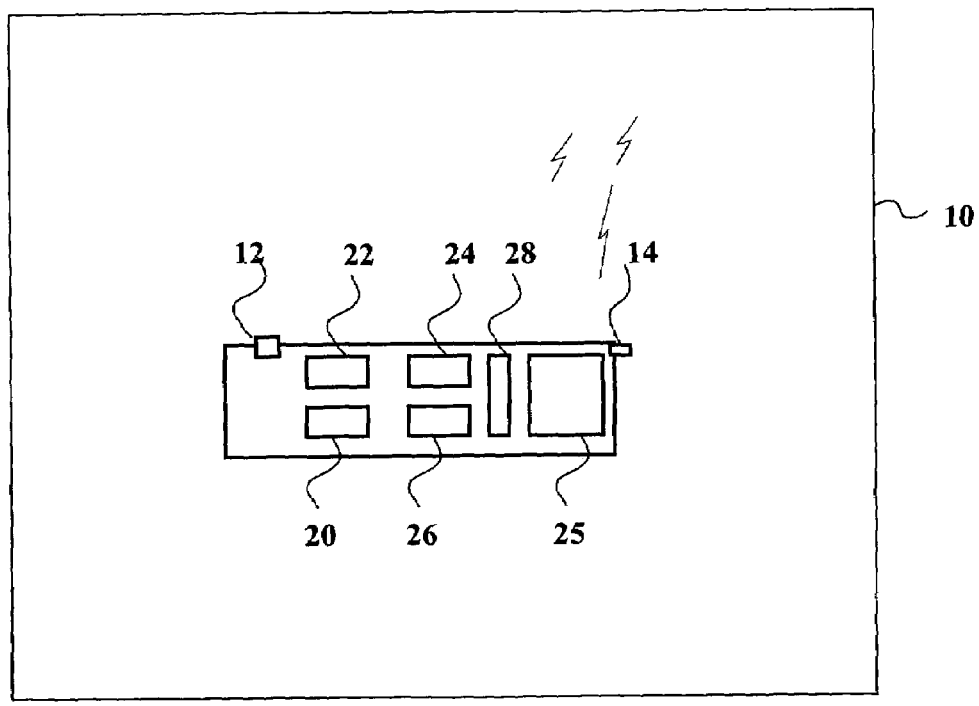
FIG. 1 is a schematic of a portable loss prevention system

FIG. 1 is schematic of a portable loss prevention system 10 comprising a processor 20 interconnected with switches 12, motion sensors 22, memory 28, transceiver 26, battery 24, alert center 25 and antenna 14. An attachment system, such as a clip, ring, fastening mechanism may be attached to the loss prevention system.

Switches 12 can be any type of button, switch, remote sensor, touch sensor, contact sensor or activation system. Switches 12 are used to initiate or to reset the loss prevention system. Switches 12 may be used to turn on/off the loss prevention system or to shut off alert center 25.

Motion sensors 22 can be simple arrangements to detect a change in state/location, a device capable of detecting a change from idle state to moving state, MEMS gyroscopes, MEMS accelerometers, tilt sensors, vibration sensor, or a combination of the above,. MEMS are micro-electromechanical systems or microscopic machines with electrical and mechanical parts on a silicon chip. Gyroscopes can be any kind of angular rate sensors such as those manufactured by Analog Devices, which generate output signals that are indicative of angular rates. The output signals may be converted to data sequences using electronic components such as resistors and capacitors. Accelerometers can be any kind of acceleration sensors such as those manufactured by Analog Devices, which generate output signals that are indicative of the acceleration. The output signals are converted to data sequences.

Transceiver 26 is any type of transceiver or a combination of transmitter and receiver. In a preferred embodiment, transceiver 26 conforms to BlueTooth specifications, 802.11, WiLAN, or any other communication protocol (BlueTooth may also be spelled Bluetooth, with both terms considered equivalent herein). Transceiver 26 can discover other compatible transceivers in the vicinity. Transceiver 26 can establish a temporary two-way connection or a piconet network with other devices equipped with compatible transceivers.

Battery 24 provides power to some of the components of loss prevention system 10. It will be understood that battery 24 may be a fuel cell, nickel-cadmium, lithium, alkaline or nickel-hydride battery or any other portable source of electric power. Battery 24 can also be replaced with photovoltaic cells.

When loss prevention system 10 is not in operation it remains in a dormant state ("sleep-mode") to conserve the energy of battery 24.

Alert center 25 can be any type of visual, audio, tactile or mechanical user interface means capable of conveying information to the user. An example of visual means is an LED, or any visual information display device. Audio means can be any audio device such as a speaker, a buzzer, a Piezo buzzer. Tactile means can be any tactile sensor such as a heat-generating device. An example of a mechanical means is a vibrator.

Antenna 14 can be any type of antenna including patch antenna and dipole antennas.

Figure 2:
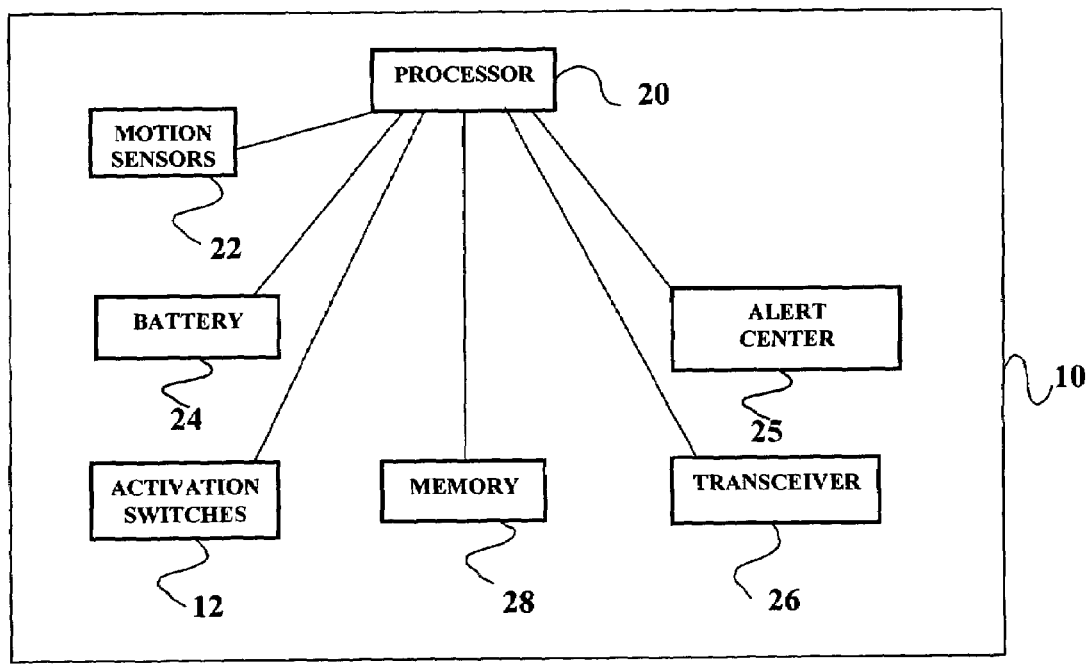
FIG. 2 is a block diagram of portable loss prevention system

Referring now to FIG. 2, in one embodiment, portable loss prevention system 10 comprises a processor 20 interconnected with switches 12, motion sensors 22, memory 28, transceiver 26, battery 24, and alert center 25.

Figure 3:
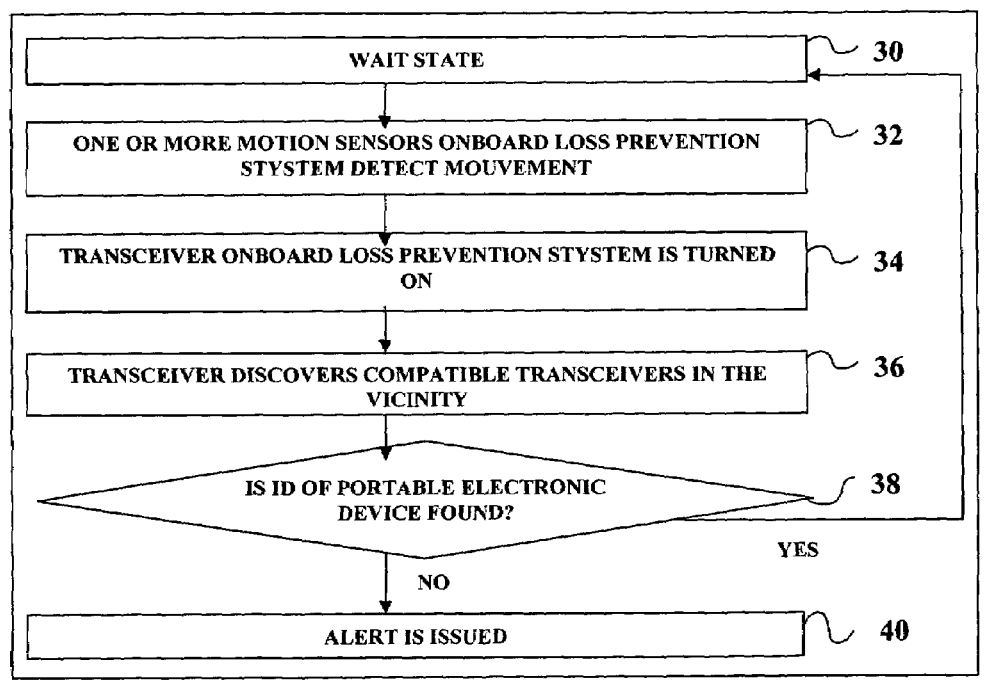
FIG. 3 is a flowchart illustrating the operation of a loss prevention system

Turning now to FIG. 3, the flowchart illustrates the steps involved in detecting that a portable electronic device is outside a range.

In step 30 the loss prevention system is in sleep mode. In step 32, motion sensors 22 detect movement. In step 34 transceiver 26 is turned on and in step 36, it discovers compatible transceivers in the vicinity.

Transceiver 26 can be a Bluetooth, WIFI, WiMax transceiver, or any widely available protocol based transceiver technology. In the case of Bluetooth, a Bluetooth transceiver (class 2) can discover any Bluetooth transceiver within a radius of 10 meters seamlessly. A class 1 Bluetooth transceiver can detect any Bluetooth transceiver within a radius of 100 meters.

Launched in 1994 by Ericsson, Bluetooth began as a project to unify communication between different types of electronic devices without the use of cumbersome cable connections. In fact, Bluetooth was taken from the nickname of Viking king, Harald II—who unified warring Viking tribes during the tenth century—and whose discolored teeth were a result of his partiality for blueberries and blackberries.

Bluetooth uses radio chips in electronic devices to enable connectivity over the 2.4 GHz radio frequency (RF) band. The Bluetooth specification (a de facto standard containing information required to ensure that devices supporting Bluetooth can communicate with each other worldwide) defines two transmission ranges for personal area networking. The range is between 10 m and 100 m without a line of sight requirement. The radio link is capable of voice and data transmission up to a maximum capacity of 720 kbps per channel.

A Bluetooth network is completely self organising, and ad hoc personal area networks (PANs) can be established wherever two or more Bluetooth devices are sufficiently close to establish radio contact. Equipment capable of Bluetooth connectivity is able to self-organise by automatically searching its vicinity for other Bluetooth-enabled devices. Upon establishing a contact, information is exchanged which determines if the connection should be completed or not.

During this first encounter, the Bluetooth devices connect via a process of authorisation and authentication.

Here is how Bluetooth devices connect to each other: Unlike the wired technology Bluetooth is designed to replace, a Bluetooth device does not have to be aware of the devices and capabilities they are attaching to. There is a built in mechanism to inquire for devices (in other terms, discover devices in the vicinity), connect to them and once connected discover the services they possess in their database. In its simplest form the devices needing to connect proceed as follows:

1) The master enters inquiry mode and sends out an inquiry to discover devices available to connect to.
2) Potential slaves make themselves discoverable by entering inquiry scan mode and listen for an inquiry from a master.
3) On receiving an inquiry, the slave responds to the master with a Frequency Hop Synchronization packet (FHS). The FHS contains information that is needed to create a connection to the device; this information includes its Bluetooth address and class of device.
4) The master collects the FHS information from each device discovered.
5) To connect to one of these devices the master goes into page mode and will page the device using the corresponding Bluetooth address.

The slave being paged by a master will need to be in page scan mode to be able to connect to a master.

In step 36, only steps 1 through 4 are executed. In step 38, Processor 20 reads the ID of a portable electronic device being monitored from memory and compares it to discovered transceiver IDs. If the ID of the portable electronic device being monitored is found, the transceiver is turned off, and the system goes to a sleep mode in step 30 in order to conserve battery power. Transceiver 26 may be turned off before the Bluetooth authorization and authentication steps are completed.

If the ID of the portable monitored electronic device is not found, processor 20 turns the transceiver off and issues an alert to the user in step 40. Processor 20 can start a buzzer, a vibrator, or a sound system. Processor 20 can also activate LEDs. An example of an audible warning message could loudly state "Your phone is no longer in authorized area" or "This child or dog is separated from his family, please call . . . ."

Figure 4:
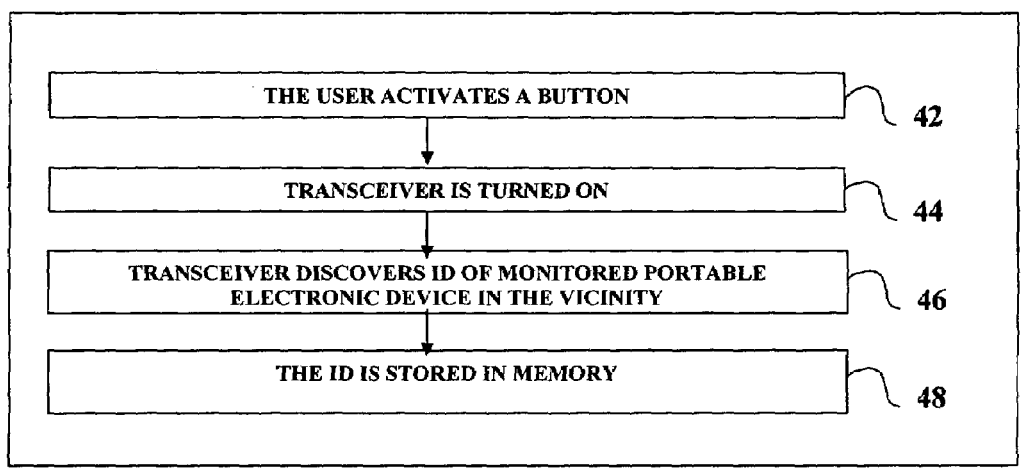
FIG. 4 is a flowchart illustrating initiating the loss prevention system

Turning now to FIG. 4, the flowchart illustrates the steps involved in initiating the loss prevention system.

In step 42, the user activates switch 12 and transceiver 26 is turned on in step 44. In step 46, it discovers the ID of monitored portable electronic device in the vicinity. An LED, a buzzer or an audio device may be activated to inform the user of the success/failure of the operation. In step 48, said ID is stored in memory. Portable electronic device can be a cellular phone, personal digital assistant (PDA), wireless email device, instant messaging device or pager.

Figure 5:
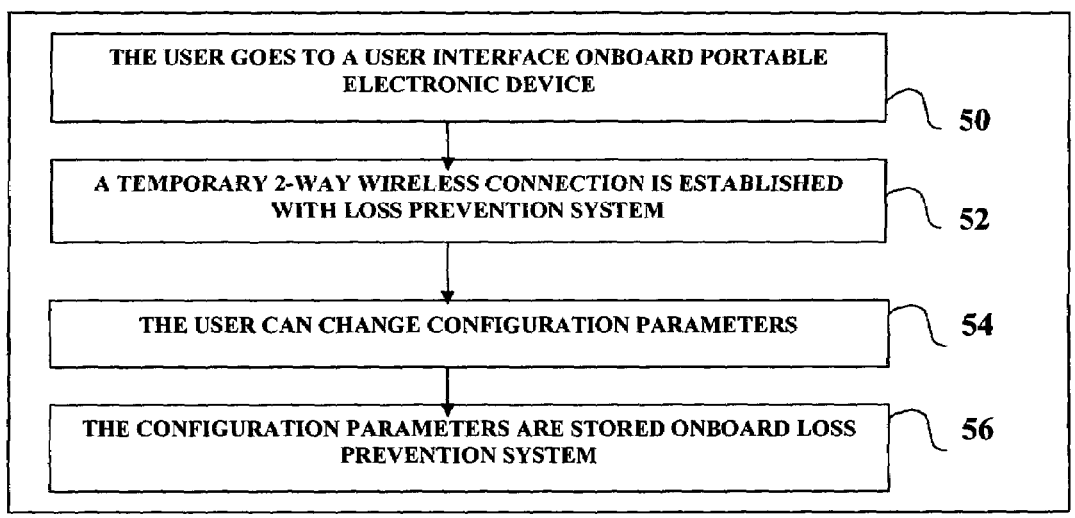
FIG. 5 is a flowchart illustrating configuring the loss prevention system

Turning now to FIG. 5, the flowchart illustrates the configuration of the loss prevention system 10 using a portable electronic device.

In step 50, the user launches a user interface onboard the portable electronic device. A two-way wireless connection is established with the loss prevention system in step 52. The user interface may display existing configuration parameters. The user interface allows the user to set configuration parameters or to change them in step 54. Configuration parameters may include operation hours, operation days, buzzer type, buzzer volume, buzzer duration, alarm type. The configuration parameters are stored onboard the loss prevention system in step 56.

The user interface is a program that can be installed onboard the portable electronic device from the monitoring device, from a CD, or from other medium such as Internet.

Figure 6:
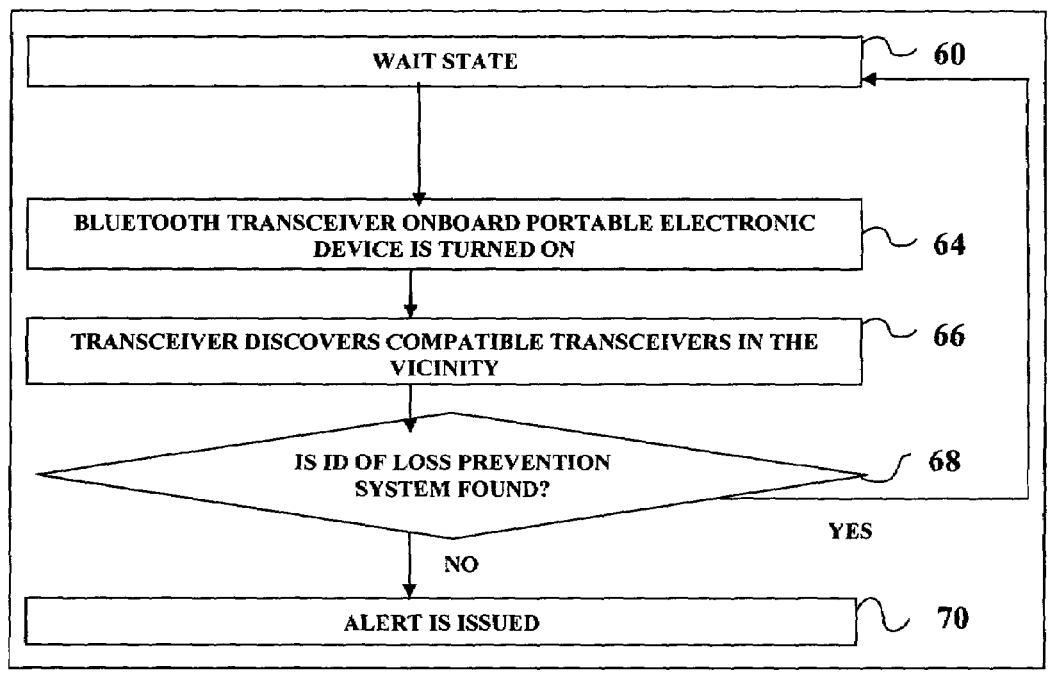
FIG. 6 is a flowchart illustrating the operation of a portable electronic device Similar reference numerals are used in different figures to denote similar components.

Turning now to FIG. 6, the flowchart illustrates the steps involved in detecting that a loss prevention system is outside the range of portable electronic device. This flowchart can be complementary to FIG. 3, and can be executed in parallel with the flowchart of FIG. 3.

In step 60 the portable electronic device is in sleep mode for a predetermined period of time. In step 64, after the period of time is expired, a transceiver onboard the portable electronic device is turned on and in step 66, it discovers compatible transceivers in the vicinity.

The transceiver can be a Bluetooth, WIFI, WiMax transceiver, or any widely available protocol based transceiver technology.

In step 68, a processor onboard the portable electronic device reads the ID of loss prevention system being monitored from memory and compares it to discovered transceiver IDs. If the ID of the loss prevention system being monitored is found in the discovered transceiver IDs, the transceiver is turned off, and the system goes to a sleep mode in step 60. Bluetooth transceiver may be turned off before the Bluetooth authorization and authentication steps are completed.

If the ID of the loss prevention system is not found, an alert is issued to the user in step 60. The alert can be in the form of a buzzer, a vibrator, or a sound. LEDs can also be activated. An example of an audible warning message could loudly state "Your device is no longer in authorized area".

Numerous other modifications, variations, and adaptations may be made to the particular embodiment of the invention described above without departing from the scope of the invention, which is defined in the claims. Hence, while exemplary embodiments of the present invention have been set forth above, it is to be understood that the pioneer inventions disclosed herein may be constructed or used otherwise than as specifically described.

What is claimed is:

1. A unitary remotely configurable portable electronic device loss prevention system comprising: a first portable device, said first portable device comprising a first Bluetooth transceiver, a motion detection system for detection of movement of said first portable device, wherein said first Bluetooth transceiver can obtain the Bluetooth ID of a second Bluetooth transceiver in a second portable electronic device when said first portable device is in the vicinity of the second portable electronic device having a second Bluetooth transceiver, a memory wherein said memory can store the Bluetooth ID of a second Bluetooth transceiver when transmitted to said first Bluetooth transceiver, a processor, and an alert system, wherein upon detection of movement of said first portable device by said motion detection system said first portable device determines the presence or absence of a second portable electronic device in the vicinity by determining whether or not there is a second Bluetooth transceiver within the vicinity of said first portable device that transmits a Bluetooth ID that matches the Bluetooth ID stored in said memory, wherein said first portable device turns off said first Bluetooth transceiver when said second portable device is present in the vicinity and wherein said first portable device activates said alert system in the event the second portable electronic device is not detected in the vicinity.

2. The device of claim 1 wherein said second portable electronic device is a wireless communication device.

3. The device of claim 1 wherein said motion detection system comprises one or more motion detectors.

4. The device of claim 1 wherein said motion detection system comprises one or more sensors selected from the set comprised of switches, tilt sensors, vibration sensors, accelerometers and gyros.

5. The device of claim 1 wherein said alert system comprises a buzzer.

6. The device of claim 1 wherein said alert system comprises an audio system.

7. The device of claim 1, further comprising at least one battery.

8. The device of claim 1 comprising means for attaching said loss prevention system to a person or clothing selected from the group consisting of: a clip, a ring, and a fastening mechanism.

\* \* \* \* \*